(12) United States Patent
Beisel (10) Patent No.: US 10,564,020 B2
(45) Date of Patent: Feb. 18, 2020

(54) FLOW-RATE MONITORING SYSTEM FOR A PRESSURE PUMP

(71) Applicant: Halliburton Energy Services, Inc., Houston, TX (US)

(72) Inventor: Joseph A. Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 234 days.

(21) Appl. No.: 15/743,405

(22) PCT Filed: Sep. 4, 2015

(86) PCT No.: PCT/US2015/048588
§ 371 (c)(1),
(2) Date: Jan. 10, 2018

(87) PCT Pub. No.: WO2017/039692
PCT Pub. Date: Mar. 9, 2017

(65) Prior Publication Data
US 2018/0202850 A1  Jul. 19, 2018

(51) Int. Cl.
*G01F 3/16* (2006.01)
*F04B 53/00* (2006.01)
(Continued)

(52) U.S. Cl.
CPC .......... *G01F 3/16* (2013.01); *F04B 49/06* (2013.01); *F04B 49/065* (2013.01);
(Continued)

(58) Field of Classification Search
None
See application file for complete search history.

(56) References Cited

U.S. PATENT DOCUMENTS 4,705,459 A    11/1987  Buisine et al.
RE33,649 E *   7/1991   Kawai .............. G01F 1/26
                                                   137/486
(Continued)

FOREIGN PATENT DOCUMENTS

WO   2011095935   8/2011
WO   2017039695   3/2017
(Continued)

OTHER PUBLICATIONS

International Patent Application No. PCT/US2015/048588, "International Search Report and Written Opinion", dated May 4, 2016, 8 pages.

(Continued)

*Primary Examiner* — Roy Y Yi
(74) *Attorney, Agent, or Firm* — Kilpatrick Townsend & Stockton LLP (57) ABSTRACT

A flow-rate monitoring system may include a position sensor, a strain gauge, and a computing device for determining a rate of fluid flow through a pump using strain measurements. The strain gauge may determine strain in the chamber. The position sensor may determine the position of a crankshaft coupled to a plunger in the chamber. The computing device may receive signals generated by the strain gauge and the position sensor related to the strain in the chamber and the position of the crankshaft and process the signals to determine a flow rate through the chamber of the pump.

20 Claims, 7 Drawing Sheets

(51) Int. Cl.
  *F04B 49/22* (2006.01)
  *F04B 49/06* (2006.01)
  *G01F 15/00* (2006.01)
  *F04B 49/10* (2006.01)
  *F04B 51/00* (2006.01)
  *F04B 53/10* (2006.01)
  *E21B 43/26* (2006.01)

(52) U.S. Cl.
  CPC ............ *F04B 49/106* (2013.01); *F04B 49/22* (2013.01); *F04B 49/225* (2013.01); *F04B 51/00* (2013.01); *F04B 53/00* (2013.01); *F04B 53/10* (2013.01); *G01F 15/005* (2013.01); *E21B 43/26* (2013.01); *F04B 2205/03* (2013.01)

(56) References Cited

U.S. PATENT DOCUMENTS

| | | | |
|---|---|---|---|
| 5,846,056 A | 12/1998 | Dhindsa et al. | |
| 6,155,347 A | 12/2000 | Mills | |
| 6,882,960 B2 | 4/2005 | Miller et al. | |
| 7,623,986 B2 | 11/2009 | Miller et al. | |
| 8,807,960 B2 | 8/2014 | Stephenson et al. | |
| 2002/0007952 A1* | 1/2002 | Vann | E21B 43/126 166/369 |
| 2004/0018100 A1 | 1/2004 | Takagi et al. | |
| 2005/0180868 A1 | 8/2005 | Miller | |
| 2007/0041849 A1* | 2/2007 | Allen | F04B 9/02 417/273 |
| 2007/0139211 A1* | 6/2007 | Pessin | E21B 47/0008 340/679 |
| 2007/0140869 A1 | 6/2007 | St. Michel et al. | |
| 2009/0041588 A1 | 2/2009 | Hunter et al. | |
| 2009/0129935 A1 | 5/2009 | Kunkler et al. | |
| 2009/0317262 A1 | 12/2009 | Gilpatrick | |
| 2012/0144995 A1* | 6/2012 | Bayyouk | F04B 1/0456 91/472 |
| 2013/0151216 A1 | 6/2013 | Palka et al. | |
| 2014/0096957 A1 | 4/2014 | Van Zuilekom et al. | |
| 2015/0027693 A1 | 1/2015 | Edwards et al. | |

FOREIGN PATENT DOCUMENTS

| | | |
|---|---|---|
| WO | 2017039698 | 3/2017 |
| WO | 2017039700 | 3/2017 |
| WO | 2017039701 | 3/2017 |

OTHER PUBLICATIONS

International Patent Application No. PCT/US2015/048610, "International Search Report and Written Opinion", dated May 4, 2016, 9 pages.

International Patent Application No. PCT/US2015/048647, "International Search Report and Written Opinion", dated May 4, 2016, 8 pages.

International Patent Application No. PCT/US2015/048673, "International Search Report and Written Opinion", dated Jun. 3, 2016, 15 pages.

International Patent Application No. PCT/US2015/048696, "International Search Report and Written Opinion", dated May 4, 2016, 8 pages.

\* cited by examiner

FLOW-RATE MONITORING SYSTEM FOR A PRESSURE PUMP

TECHNICAL FIELD

The present disclosure relates generally to pressure pumps and, more particularly (although not necessarily exclusively), to using strain measurements to determine a flow rate in a pressure pump.

BACKGROUND

Pressure pumps may be used in wellbore treatments. For example, hydraulic fracturing (also known as "fracking" or "hydro-fracking") may utilize a pressure pump to introduce or inject fluid at high pressures into a wellbore to create cracks or fractures in downhole rock formations. A flowmeter may monitor the flow rate of the fluid through the pressure pump, but may require constant maintenance and inspection to verify the flowmeter is operating properly to provide an accurate reading of the flow rate. The frequent inspection of the flowmeter and the inability to ensure the accuracy of the flowmeter during operation of the pressure pump may result in additional time and costs to a pumping operation.

DETAILED DESCRIPTION

Certain aspects and examples of the present disclosure relate to a flow-rate monitoring system for determining the flow rate of fluid through a pressure pump using strain measurements. The pressure pump may be in fluid communication with an environment of a wellbore. The pressure pump may include a chamber on a fluid end of the pressure pump for receiving and discharging fluid for injecting the fluid into the wellbore. A suction valve in the chamber may be actuated to open and close to allow fluid to enter the chamber from an inlet manifold in response to the movement of a plunger in the chamber. A discharge valve in the chamber may be actuated to open and close to allow fluid to exit the chamber in response to the movement of the plunger. As fluid is received and discharged from the chamber, strain in the fluid end may fluctuate. A flow-rate monitoring system according to some aspects may determine strain in the chamber based on a strain signal. The strain signal may be generated by a strain gauge coupled to the fluid end of the pressure pump and may represent strain in the chamber. In some aspects, the flow-rate monitoring system may determine actuation points representing the opening and closing of the suction and discharge valves in the chamber based on discontinuities in the strain signal.

A flow-rate monitoring system according to some aspects may also determine a position of the plunger in the chamber at the time of the valve actuation. The plunger position may be determined by cross-referencing the actuation points of the valves with a position signal generated by a position sensor. The position sensor may be coupled to the power end of the pressure pump. The position signal generated by the position sensor may represent the position of a crankshaft or other member of a rotation assembly of the pump. The flow-rate monitoring system may correlate movement of the plunger with the time between the actuation points of the valve to determine a volume of fluid entering the chamber or being discharged from the chamber during the actuation of the suction valve or the discharge valve, respectively. The volume of fluid entering or being discharged from the chamber between the opening and closing of the suction valve or discharge valve may correspond to the flow rate of the fluid through the pressure pump.

A flow-rate monitoring system according to some aspects may determine the actuation of the valves in the pressure pump without breaching the external surface of the pressure pump. For example, the strain gauge may be positioned on the external surface of the fluid end of the pressure pump and the position sensor may be positioned on an external surface of the power end of the pressure pump to measure and generate signals corresponding to the strain in the chamber and the position of the crankshaft, respectively. In this manner, an additional stress concentration is not added to the pressure pump in the form of a hole or other breach of the pressure pump to access an interior of the fluid end. Eliminating or not including additional stress concentration caused by a breach of the pressure pump may extend the fatigue life of the pressure pump. Further, a flow-rate monitoring system may determine the actuation of the valves of the pressure pump using strain measurements, as opposed to pressure or other measurements for determining the internal conditions of the chamber to allow for relaxed requirements in the accuracy of the strain gauge. Based on the ability of the strain gauge to characterize the loading and unloading of the strain in the signal (even without knowing the precise amount of pressure in the chamber), the flow-rate monitoring system may be able to accurately determine the actuation of the valves in the pressure pump.

In some examples, an accurate and reliable measurement of the flow rate of the pressure pump may be provided. A flow-rate monitoring system may be used additionally or alternatively to a conventional flowmeters that may be used for pressure pumps. The flow-rate monitoring system may provide both low-pressure (e.g., suction) and high-pressure (e.g., discharge) rates, which may require the use of two conventional flowmeters, including at least one flowmeter rate for high pressure. Further, flowmeters may require regular maintenance and inspection to ensure proper functioning of the flowmeters to provide accurate flow-rate measurements for the pressure pump. The use of strain measurements and crankshaft position by the flow-rate monitoring system to determine a flow rate of the pressure pump allows for a reliable and accurate flow rate measurement. In some aspects, the flow-rate monitoring system may also utilize the strain measurements and crankshaft position to monitor conditions of the valves of the pressure pump (e.g., leaks in a valve) that may affect the flow-rate measurements. The accuracy of the flow-rate measurements may be self-verified by the flow-rate monitoring system without halting the operation of the pressure pump.

Figure 1A:
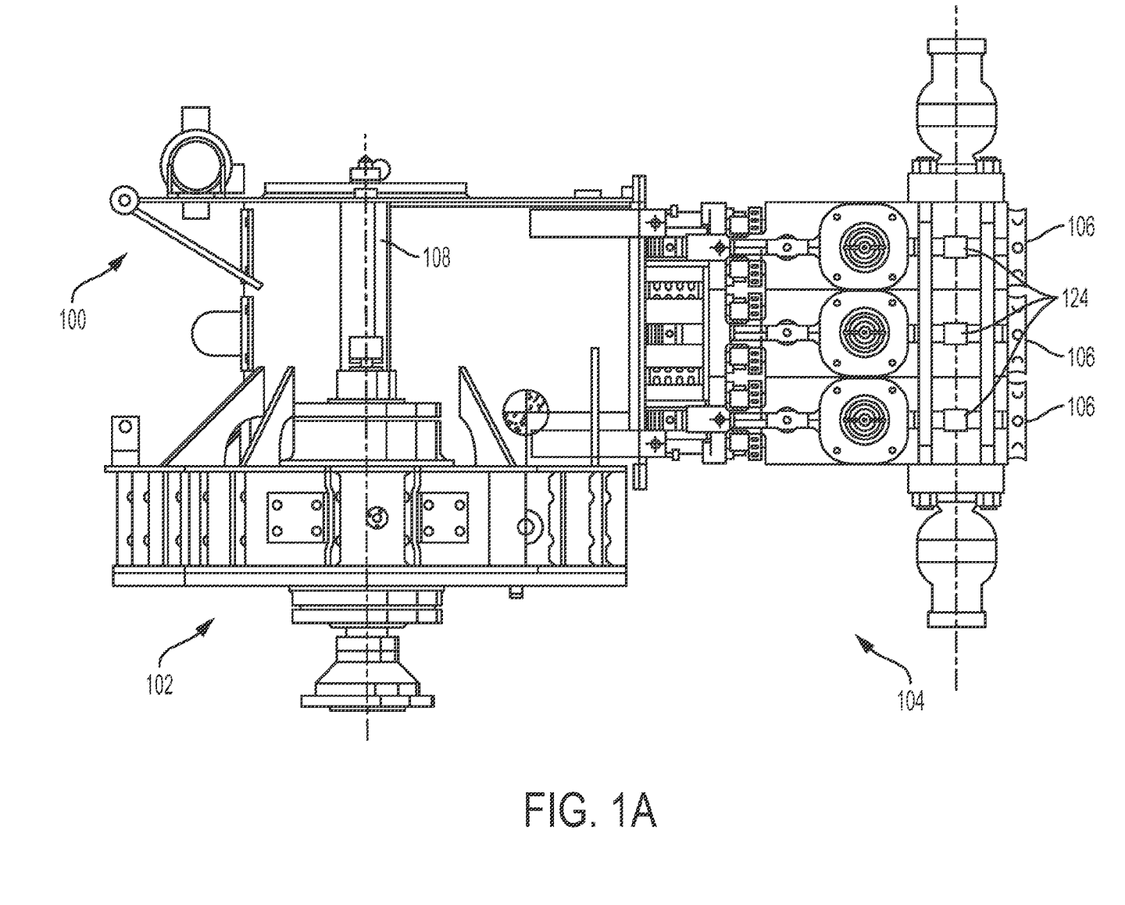
FIG. 1A is a cross-sectional, top view schematic diagram depicting an example of a pressure pump that may include a flow-rate monitoring system according to one aspect of the present disclosure.
Figure 1B:
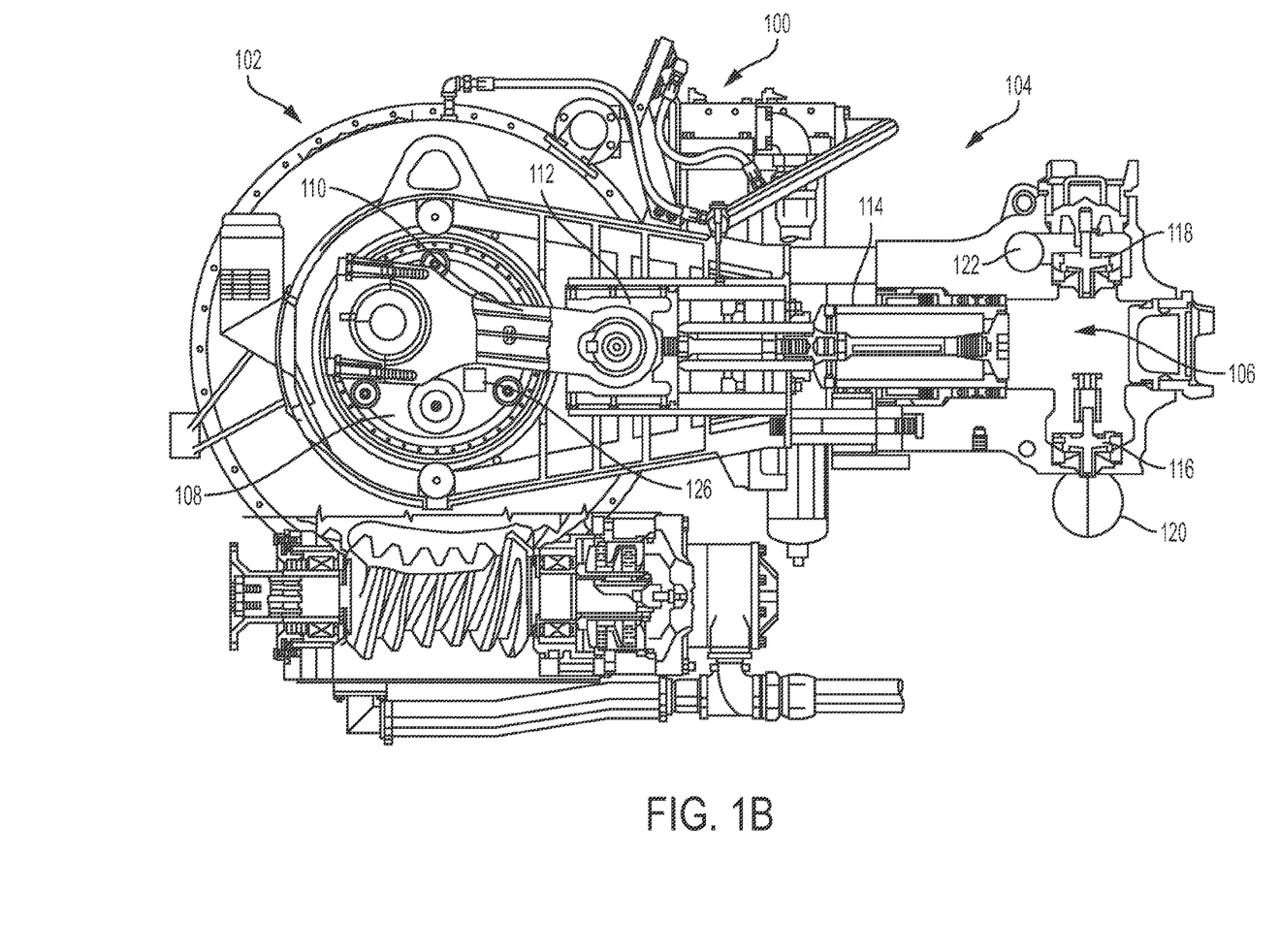
FIG. 1B is a cross-sectional, side view schematic diagram depicting the pressure pump of FIG. 1A according to one aspect of the present disclosure.

FIGS. 1A and 1B show a pressure pump 100 that may utilize a flow-rate monitoring system according to some aspects of the present disclosure. The pressure pump 100 may be any positive displacement pressure pump. The pressure pump 100 may include a power end 102 and a fluid end 104. The power end 102 may be coupled to a motor, engine, or other prime mover for operation. The fluid end 104 includes chambers 106 for receiving and discharging fluid flowing through the pressure pump 100. Although FIG. 1A shows three chambers 106 in the pressure pump 100, the pressure pump 100 may include any number of chambers 106, including one, without departing from the scope of the present disclosure.

The pressure pump 100 may also include a rotating assembly. The rotating assembly may include a crankshaft 108, one or more connecting rods 110, a crosshead 112, plungers 114, and related elements (e.g., pony rods, clamps, etc.). The crankshaft 108 may be positioned on the power end 102 of the pressure pump 100 and may be mechanically connected to a plunger in a chamber 106 of the pressure pump via the connecting rod 110 and the crosshead 112. The crankshaft 108 may include an external casing or crankcase. The crankshaft 108 may cause a plunger 114 located in a chamber 106 to displace any fluid in the chamber 106. In some aspects, each chamber 106 of the pressure pump 100 may include a separate plunger 114, each plunger 114 in each chamber 106 mechanically connected to the crankshaft 108 via the connecting rod 110 and the crosshead 112. Each chamber 106 may include a suction valve 116 and a discharge valve 118 for absorbing fluid into the chamber 106 and discharging fluid from the chamber 106, respectively. The fluid may be absorbed into and discharged from the chamber 106 in response to a movement of the plunger 114 in the chamber 106. Based on the mechanical coupling of the crankshaft 108 to the plunger 114 in the chamber 106, the movement of the plunger 114 may be directly related to the movement of the crankshaft 108.

A suction valve 116 and a discharge valve 118 may be included in each chamber 106 of the pressure pump 100. In some aspects, the suction valve 116 and the discharge valve 118 may be passive valves. As the plunger 114 operates in the chamber 106, the plunger 114 may impart motion and pressure to the fluid by direct displacement. The suction valve 116 and the discharge valve 118 may open and close based on the displacement of the fluid in the chamber 106 by the operation of the plunger 114. For example, the suction valve 116 may be opened during a recession of the plunger 114 to provide absorption of fluid from outside of the chamber 106 into the chamber 106. As the plunger 114 is withdrawn from the chamber 106, a partial suction may be created to open the suction valve 116 to allow fluid to enter the chamber 106. In some aspects, the fluid may be absorbed into the chamber 106 from an inlet manifold 120. Fluid already in the chamber 106 may move to fill the space where the plunger 114 was located in the chamber 106. The discharge valve 118 may be closed during this process.

The discharge valve 118 may be opened as the plunger 114 moves forward or reenters the chamber 106. As the plunger 114 moves further into the chamber 106, the fluid may be pressurized. The suction valve 116 may be closed during this time to allow the pressure on the fluid to force the discharge valve 118 to open and discharge fluid from the chamber 106. In some aspects, the discharge valve 118 may discharge the fluid into a discharge manifold 122. The loss of pressure inside the chamber 106 may allow the discharge valve 118 to close and the cycle may restart. Together, the suction valve 116 and the discharge valve 118 may operate to provide the fluid flow in a desired direction. The process may include a measurable amount of pressure and stress in the chamber 106, the stress resulting in strain to the chamber 106 or fluid end 104 of the pressure pump 100. A flow-rate monitoring system may be coupled to the pressure pump 100 to gauge the strain and determine a rate of fluid flow through the chamber 106.

In some aspects, a monitoring system according to some aspects of the present disclosure may be coupled to the pressure pump 100 to gauge the strain and determine actuation of the suction valve 116 and the discharge valve 118 in the chamber 106. For example, a monitoring system may include strain gauges positioned on an external surface of the fluid end 104 to gauge strain in the chambers 106. Blocks 124 in FIG. 1A show example placements for each of the strain gauges that may be included in the monitoring system. In some aspects, the monitoring system may include a separate strain gauge to monitor strain in each chamber 106 of the pressure pump 100. In some aspects, a monitoring system according to some aspects may also include one or more position sensors for sensing the position of the crankshaft 108. Measurements of the crankshaft position may allow the monitoring system to determine the position of the plungers 114 in the respective chambers 106. A position sensor of the monitoring system may be positioned on an external surface of the pressure pump 100. Block 126 shows an example placement of a position sensor on an external surface of the power end 102 to sense the position of the crankshaft 108. In some aspects, measurements from the position sensor may be correlated with the measurements from the strain gauges to determine actuation delays corresponding to the valves 116, 118 in each chamber 106 of the pressure pump 100 for identifying cavitation in the fluid end 104.

Figure 2:
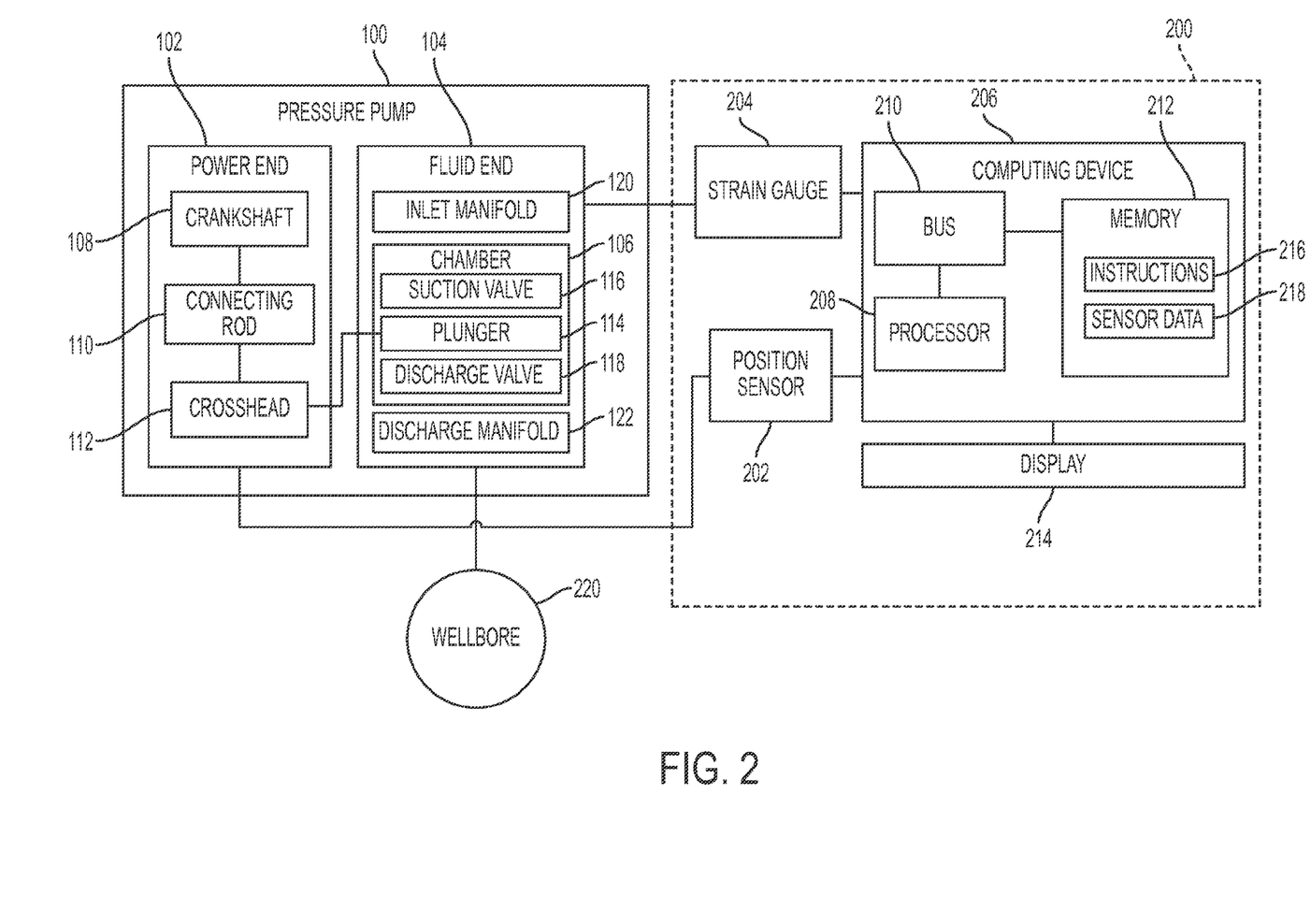
FIG. 2 is a block diagram depicting a flow-rate monitoring system for a pressure pump according to one aspect of the present disclosure.

FIG. 2 is a simple block diagram showing an example of a flow-rate monitoring system 200 coupled to the pressure pump 100. The flow-rate monitoring system 200 may include a position sensor 202, a strain gauge 204, and a computing device 206. The position sensor 202 and the strain gauge 204 may be coupled to the pressure pump 100. The position sensor 202 may include a single sensor or may represent an array of sensors. The position sensor 202 may be a magnetic pickup sensor capable of detecting ferrous metals in close proximity. The position sensor 202 may be positioned on the power end 102 of the pressure pump 100 for determining the position of the crankshaft 108. In some aspects, the position sensor 202 may be placed proximate to a path of the crosshead 112. The path of the crosshead 112 may be directly related to a rotation of the crankshaft 108. The position sensor 202 may sense the position of the crankshaft 108 based on the movement of the crosshead 112.

In other aspects, the position sensor 202 may be placed on the power end 102 as illustrated by block 126 in FIG. 1A. The position sensor 202 may determine a position of the crankshaft 108 or other member of the rotating assembly based on a bolt pattern or other feature of the rotating assembly during operation of the pressure pump 100. In each aspect, the position sensor 202 may generate a signal representing the position of the rotating assembly and transmit the signal to the computing device 206.

The strain gauge 204 may be positioned on the fluid end 104 of the pressure pump 100. The strain gauge 204 may include a single gauge or an array of gauges for determining strain in the chamber 106. Non-limiting examples of types of strain gauges may include electrical resistance strain gauges, semiconductor strain gauges, fiber optic strain gauges, micro-scale strain gauges, capacitive strain gauges, vibrating wire strain gauges, etc. In some aspects, the flow-rate monitoring system 200 may include a strain gauge 204 for each chamber 106 of the pressure pump 100 to determine strain in each of the chambers 106, respectively. In some aspects, the strain gauge 204 may be positioned on an external surface of the fluid end 104 of the pressure pump 100 in a position subject to strain in response to stress in the chamber 106. For example, the strain gauge 204 may be positioned on a section of the fluid end 104 in a manner such that when the chamber 106 loads up, strain may be present at the location of the strain gauge 204. This location may be determined based on engineering estimations, finite element analysis, or by some other analysis. For example, finite element analysis may determine that strain in the chamber 106 may be directly over a plunger bore of the chamber 106 during load up. The strain gauge 204 may be placed on an external surface of the pressure pump 100 in a location directly over the plunger bore corresponding to the chamber 106 as illustrated by blocks 124 in FIG. 1A to measure strain in the chamber 106. The strain gauge 204 may generate a signal representing strain in the chamber 106 and transmit the signal to a processor 208.

The computing device 206 may be coupled to the position sensor 202 and the strain gauge 204 to receive the generated signals from the position sensor 202 and the strain gauge 204. The computing device 206 may include the processor 208, a bus 210, and a memory 212. In some aspects, the flow-rate monitoring system 200 may also include a display unit 214. The processor 208 may execute instructions 216 including one or more operation for determining the flow rate of fluid through the pressure pump 100. The instructions 216 may be stored in the memory 212 coupled to the processor 208 by the bus 210 to allow the processor 208 to perform the operations. The processor 208 may include one processing device or multiple processing devices. Non-limiting examples of the processor 208 may include a Field-Programmable Gate Array ("FPGA"), an application-specific integrated circuit ("ASIC"), a microprocessor, etc.

The non-volatile memory 212 may include any type of memory device that retains stored information when powered off. Non-limiting examples of the memory 212 may include electrically erasable and programmable read-only memory ("EEPROM"), a flash memory, or any other type of non-volatile memory. In some examples, at least some of the memory 212 may include a medium from which the processor 208 can read the instructions 216. A computer-readable medium may include electronic, optical, magnetic or other storage devices capable of providing the processor 208 with computer-readable instructions or other program code (e.g., instructions 216). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 216. The instructions 216 may include processor-specific instructions generated by a compiler or an interpreter from code written in any suitable computer-programming language, including, for example, C, C++, C#, etc.

In some examples, the computing device 206 may determine an input for the instructions 216 based on sensor data 218 from the position sensor 202 or the strain gauge 204, data input into the computing device 206 by an operator, or other input means. For example, the position sensor 202 or the strain gauge 204 may measure a parameter associated with the pressure pump 100 (e.g., the position of the crankshaft 108, strain in the chamber 106) and transmit associated signals to the computing device 206. The computing device 206 may receive the signals, extract data from the signals, and store the sensor data 218 in memory 212.

In some aspects, the computing device 206 may generate interfaces associated with the sensor data 218 and information generated by the processor 208 therefrom to be displayed via a display unit 214. The display unit 214 may be coupled to the processor 208 and may include any CRT, LCD, OLED, or other device for displaying interfaces generated by the processor 208. In some aspects, the display unit 214 may also include audio components. The computing device 206 may generate audible interfaces associated with information generated by the processor 208 (e.g., alarms, alerts, etc.).

In some aspects, in addition to the flow-rate monitoring system 200, the pressure pump 100 may also be coupled to a wellbore 220. For example, the pressure pump 100 may be used in hydraulic fracturing to inject fluid into the wellbore 220. Subsequent to the fluid passing through the chambers 106 of the pressure pump 100, the fluid may be injected into the wellbore 220 at a high pressure to break apart or otherwise fracture rocks and other formations adjacent to the wellbore 220 to release or otherwise stimulate hydrocarbons. The flow-rate monitoring system 200 may monitor the flow of the fluid through the pressure pump 100 to determine the rate of injection of the fluid into the wellbore 220. Although hydraulic fracturing is described here, the pressure pump 100 may be used for any process or environment requiring a positive displacement pressure pump.

Figure 3:
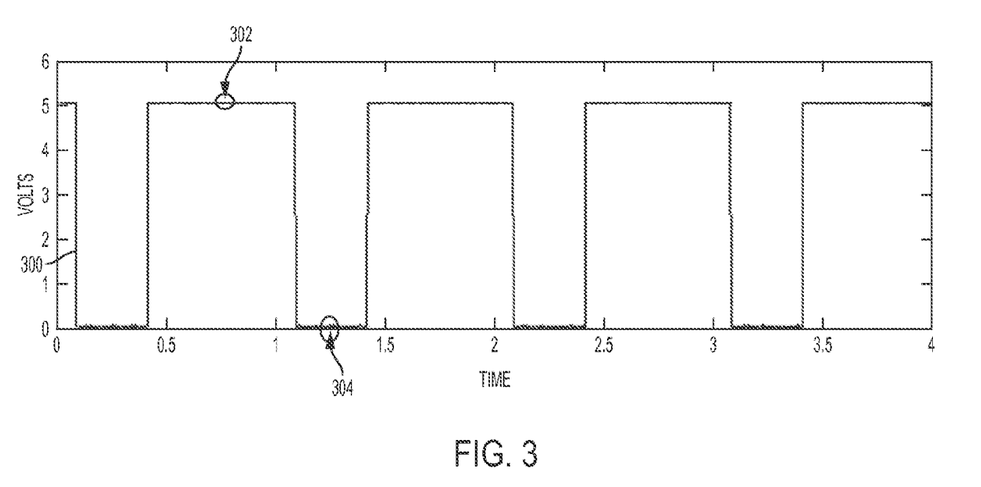
FIG. 3 is a signal graph depicting a signal generated by a position sensor of the flow-rate monitoring system of FIG. 2 according to one aspect of the present disclosure.
Figure 4:
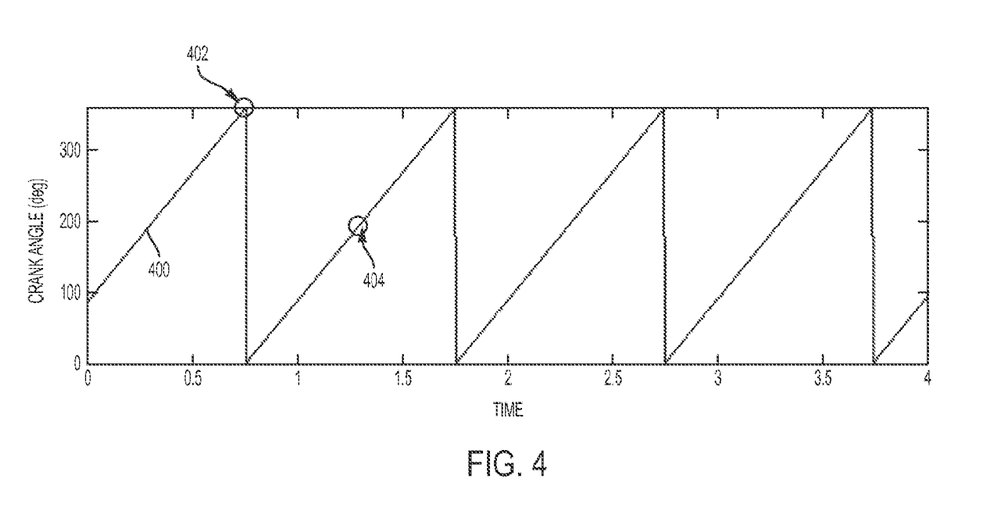
FIG. 4 is a signal graph depicting an alternative signal generated by a position sensor of the flow-rate monitoring system of FIG. 2 according to one aspect of the present disclosure.

FIGS. 3 and 4 show position signals 300, 400 generated by the position sensor 202 during operation of the crankshaft 108. In some aspects, the position signals 300, 400 may be shown on the display unit 214 in response to generation of graphical representation of the position signals 300, 400 by the computing device 206. FIG. 3 shows a position signal 300 displayed in volts over time (in seconds). The position signal 300 may be generated by the position sensor 202 coupled to the power end 102 of the pressure pump 100 and positioned in a path of the crosshead 112. The position signal 300 may represent the position of the crankshaft 108 over the indicated time as the crankshaft 108 operates to cause the plunger 114 to move in the chamber 106. The mechanical coupling of the plunger 114 to the crankshaft 108 may allow the computing device 206 to determine a position of the plunger 114 relative to the position of the crankshaft 108 based on the position signal 300. In some aspects, the computing device 206 may determine plunger position reference points 302, 304, 402, 404 based on the position signal 300 generated by the position sensor 202. For example, the processor 208 may determine dead center positions of the plunger 114 based on the position signal 300. The dead center positions may include the position of the plunger 114 in which it is farthest from the crankshaft 108, known as the top dead center. The dead center positions may also include the position of the plunger 114 in which it is nearest to the crankshaft 108, known as the bottom dead center. The distance between the top dead center and the bottom dead center may represent the length of a full stroke of the plunger 114 operating in the chamber 106.

In FIG. 3, the top dead center is represented by reference point 302 and the bottom dead center is represented by reference point 304. In some aspects, the processor 208 may determine the reference points 302, 304 by correlating the position signal 300 with a known ratio or other value representing the relationship between the movement of the crankshaft 108 and the movement of the plunger 114 (e.g., the mechanical correlations of the crankshaft 108 to the plunger 114 based on the mechanical coupling of the crankshaft 108 to the plunger 114 in the pressure pump 100). The computing device 206 may determine the top dead center and bottom dead center based on the position signal 300 or may determine other plunger position reference points to determine the position of the plunger over the operation time of the pressure pump 100.

FIG. 4 shows a position signal 400 displayed in degrees over time (in seconds). The degree value may represent the angle of the crankshaft 108 during operation of the crankshaft 108 or pressure pump 100. In some aspects, the position signal 400 may be generated by the position sensor 202 located on a crankcase of the crankshaft 108. The position sensor 202 may generate the position signal 400 based on the bolt pattern of the position sensor 202 as it rotates in response to the rotation of the crankshaft 108 during operation. Similar to the position signal 300 shown in FIG. 3, the computing device 206 may determine plunger position reference points 302, 304, 402, 404 based on the position signal 400. The reference points 402, 404 in FIG. 4 represent the top dead center and bottom dead center of the plunger 114 for the chamber 106 during operation of the pressure pump 100.

Figure 5:
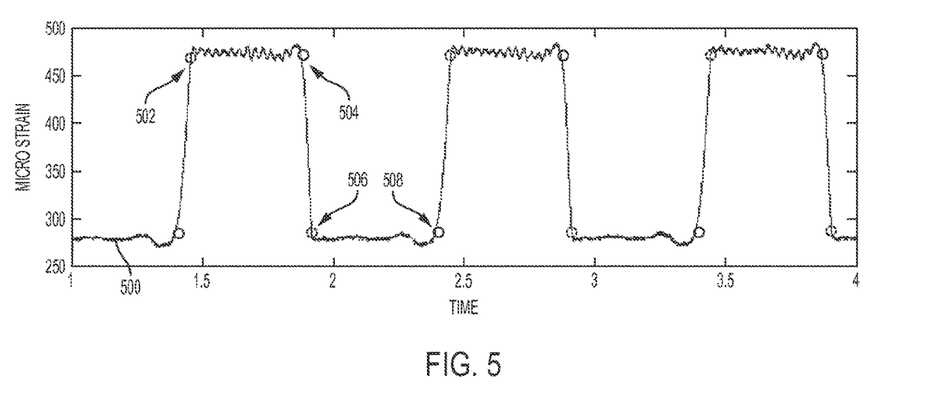
FIG. 5 is a signal graph depicting a signal generated by a strain gauge of the flow-rate monitoring system of FIG. 2 according to one aspect of the present disclosure.

FIG. 5 shows a raw strain signal 500 generated by the strain gauge 204 coupled to the fluid end 104 of the pressure pump 100 and positioned on an external surface of the fluid end 104. The strain signal 500 may represent strain measured by the strain gauge 204 in the chamber 106 of the pressure pump 100. The computing device 206 may determine the actuation points 502, 504, 506, 508 of the suction valve 116 and the discharge valve 118 for the chamber 106 based on the strain signal 500. The actuation points 502, 504, 506, 508 may represent the point in time where the suction valve 116 and the discharge valve 118 open and close. For example, the computing device 206 may execute the instructions 216 stored in the memory 212 and including signal-processing algorithms to determine the actuation points 502, 504, 506, 508. For example, the computing device 206 may execute instruction 216 to determine the actuation points 502, 504, 506, 508 by determining discontinuities in the strain signal 500. The stress in the chamber 106 may change during the operation of the suction valve 116 and the discharge valve 118 to cause the discontinuities in the strain signal 500 during actuation of the valves 116, 118 and the computing device 206 may identify the discontinuities as the opening and closing of the valves 116, 118. In one example, the strain in the chamber 106 may be isolated to the fluid in the chamber 106 when the suction valve 116 is closed. The isolation of the strain may cause the strain in the chamber 106 to load up until the discharge valve 118 is opened. When the discharge valve 118 is opened, the strain may level until the discharge valve 118 is closed, at which point the strain may unload until the suction valve 116 is reopened. The discontinuities may be present when the strain signal 500 shows a sudden increase or decrease in value corresponding to the actuation of the valves 116, 118.

In FIG. 5, actuation point 502 may represent the discharge valve 118 opening, actuation point 504 may represent the discharge valve 118 closing, actuation point 506 may represent the suction valve 116 opening, and actuation point 508 may represent the suction valve 116 closing again to resume the cycle of fluid into and out of the chamber 106. In some aspects, the computing device 206 may cause the display unit 214 to display the strain signal 500 and the actuation points 502, 504, 506, 508 as shown in FIG. 5. The exact magnitudes of strain in the chamber 106 determined by the strain gauge 204 may not be required for determining the actuation points 502, 504, 506, 508. The computing device 206 may determine the actuation points 502, 504, 506, 508 based on the strain signal 500 providing a characterization of the loading and unloading of the strain in the chamber 106.

In some aspects, the actuation points 502, 504, 506, 508 may be cross-referenced with the position signals 300, 400 to determine an actual position of the plunger 114 at the time of valve actuation. Similarly, as the position signals 300, 400 and the strain signal 500 are representative of the position of the crankshaft 108 (and by reference the plunger 114) and the strain, respectively, over time, the movement of the plunger 114 between the actuation points 502, 504, 506, 508 may be determined from the position signals 300, 400 and the strain signal 500. The movement of the plunger may be correlated with the opening of the suction valve 116 or the discharge valve 118 to determine the flow rate of the pressure pump 100.

For example, the movement of the plunger between the opening of the discharge valve (e.g., actuation point 502) and the closing of the discharge valve (e.g., actuation points 504) may correspond to the flow of fluid from the chamber into the discharge manifold 122. Fluid may not be discharged from the chamber 106 until the discharge valve 118 is opened at actuation point 502. At the time the discharge valve 118 opens, pressure inside the chamber 106 may be equalized with the pressure in the discharge manifold 122. Further motion of the plunger 114 in the chamber 106 may displace fluid from the chamber 106 into the discharge manifold 122. The flow back of the fluid from needed to close the discharge valve 118 as the plunger 114 completes its stroke may be subtracted from the volume of fluid discharged into the discharge manifold 122 to provide an accurate account of the total fluid discharged into the discharge manifold 122 during a full stroke length of the plunger 114. To determine the flow rate of the fluid into the discharge valve 118 from the chamber 106, the position of the plunger 114 at the time of the discharge valve 118 closing (e.g., actuation point 504) may be subtracted from the position of the plunger 114 at the time of the discharge valve 118 opening (e.g. actuation point 502). The flow rate of the fluid from the chamber 106 into the discharge manifold 122 may correspond to the flow rate of the fluid through the pressure pump 100.

In some aspects, the flow rate may be similarly determined based on the actuation of the suction valve 116. Specifically, the volume of fluid flowing from the inlet manifold 120 into the chamber 106 between the opening of the suction valve 116 at actuation point 506 and the closing of the suction valve 116 at actuation point 508 may provide an accurate account of the total fluid entering the chamber 106. The fluid flowing back into the inlet manifold 120 to close the suction valve 116 may be subtracted from the volume. To determine the flow rate of the fluid into the chamber 106 from the discharge valve 118, the position of the plunger 114 at the time of the suction valve 116 closing (e.g., actuation point 508) may be subtracted from the position of the plunger 114 at the time of the suction valve 116 opening (e.g., actuation point 506). The flow rate of the fluid from the inlet manifold 120 into the chamber 106 may correspond to the flow rate of the fluid through the pressure pump 100.

Figure 6:
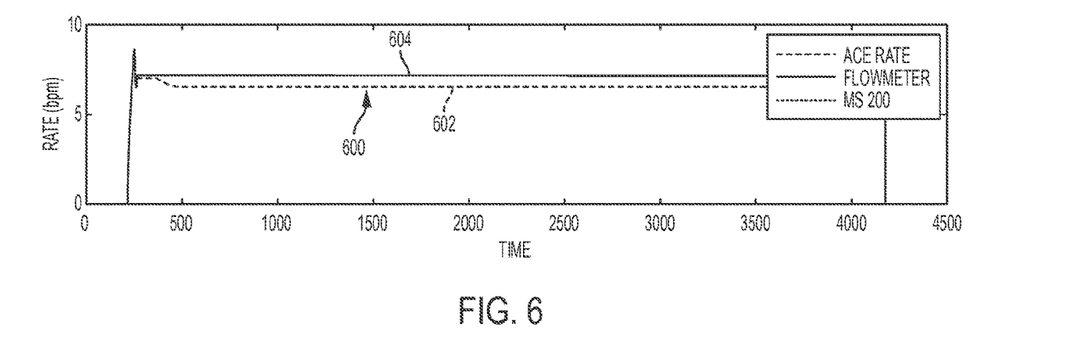
FIG. 6 is a line graph depicting an example of a flow-rate measurement determined by the flow-rate monitoring system of FIG. 2 according to one aspect of the present disclosure.
Figure 7:
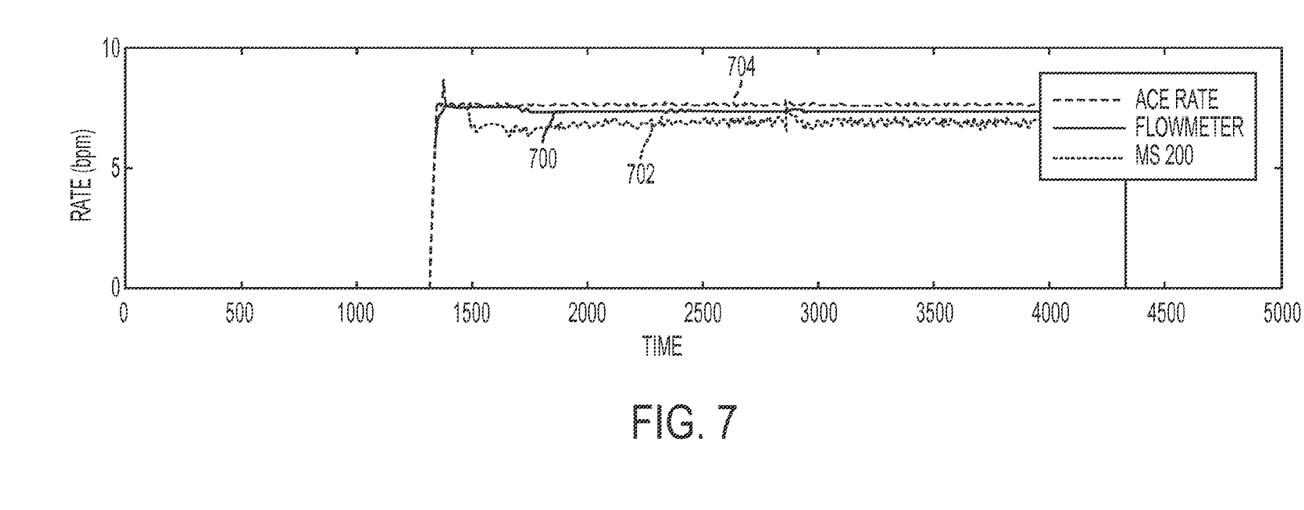
FIG. 7 is a line graph depicting an alternative example of a flow-rate measurement determined by the flow-rate monitoring system of FIG. 2 according to one aspect of the present disclosure.

FIGS. 6 and 7 show examples of line graphs generated to illustrate the flow-rate measurements by the flow-rate monitoring system 200 over time. In some aspects, the processor 208 may execute instruction 216 to cause a graph of the flow rate of the pressure pump 100 to be displayed on the display unit 214. FIG. 6 shows a measurement 600 representing a measurement of the flow rate of the pressure pump 100 determined by the flow-rate monitoring system 200 according to one aspect. The measurement 600 is depicted in terms of the rate of the pressure pump measure in barrels per minute over time in seconds. The measurement 600 indicates a consistent pump rate of approximately 6.5 barrels per minute over the observed period. For illustration purposes, FIG. 6 shows a comparison of the measurement 600 determined by the flow-rate monitoring system 200 with a measurement 602 determined by a conventional flowmeter that may be included or coupled to the pressure pump 100. The flowmeter may be a standard flowmeter device known to be functioning properly. As shown in FIG. 6, the measurement 600 and 602 may be indistinguishable in the graph, confirming the accuracy of the measurement 600 by the flow-rate monitoring system 200. Also, for illustration purposes, the measurement 600 may be further compared to a measurement 604 determined by an internal controller. The internal controller may be a control device located in the pressure pump and may determine an ideal flow rate of the pressure pump 100 based on parameters of the pressure pump 100 entered into the internal controller by an operator or technician. The measurement 600 may be compared to the measurement 604 to verify the accuracy of the measurement 600 or determine the efficiency of the pressure pump 100. For example, where there is a significant deviation in the value or trend of the measurement 600 and the measurement 604, an issue affecting the accuracy of the flow-rate monitoring system 200 may be present. The issue may correspond to the flow-rate monitoring system 200 or the pressure pump 100.

FIG. 7 shows an example of a graph where the flow rate determined by the flow-rate monitoring system 200 is compared, for additional illustration purposes, against a flowmeter known to be malfunctioning. Measurement 700 represents the measurement of the flow rate determined by the flow-rate monitoring system 200. Measurement 702 represents the measurement of the flow rate determined by the malfunctioning flowmeter. In contrast to the graph shown in FIG. 6, FIG. 7 shows a deviation in the measurements 700, 702. Common issues that may cause the flowmeter to malfunction and generate an inaccurate flow-rate measurement may include debris in the flowmeter. But, the use of strain in the chamber 106 and plunger 114 may allow the flow-rate monitoring system 200 to provide consistently accurate readings as the measurement is dependent upon the operation of the pressure pump 100 itself. Thus, issues such as debris may not affect the operability or reliability of the flow-rate monitoring system 200. Further, coupling the position sensor 202 and the strain gauge 204 to an external surface of the pressure pump 100 may limit or avoid a need to halt operation of the pressure pump 100 for inspection of the flow-rate monitoring system 200.

In some aspects, the flow-rate monitoring system 200 may provide a sole means of determining the flow rate of fluid through the pressure pump 100. In other aspects, the flow-rate monitoring system 200 may be used in addition to the flowmeter as a backup or additional verification of the flow rate of fluid through the pressure pump 100. Assuming the position sensor 202 and strain gauge 204 are properly positioned and operating, an inaccurate measurement 600, 700 of the flow-rate monitoring system 200 may be a result of a problem within the pressure pump 100. For example, the measurement 600, 700 may be skewed by a faulty suction valve 116 or discharge valve 118 in the chamber 106. In some aspects, the instruction 216 may include additional algorithms for self-verifying the condition of the valves 116, 118 during operation of the pressure pump 100 using the same position signal 300, 400 and strain signal 500 for determining the flow rate of the pressure pump 100. For example, the flow-rate monitoring system 200 may determine delays in the actuation of the valves 116, 118 and compare the delays to expected valve delays to determine whether a leak is present in the valves 116, 118. Thus, the flow-rate monitoring system 200 may self-verify the accuracy of the flow-rate measurements without delaying or halting the operation of the pressure pump 100 for inspection of the equipment of the pressure pump 100 or the flow-rate monitoring system 200. In some aspects, the measurement 700 generated by the flow-rate monitoring system 200 may also be compared to a measurement 704 determined by the internal controller in a similar manner as described with respect to the measurement 604 of FIG. 6. The flow rate computed by the flow-rate monitoring system 200 may also be used to tune parameters within the internal controller.

Figure 8:
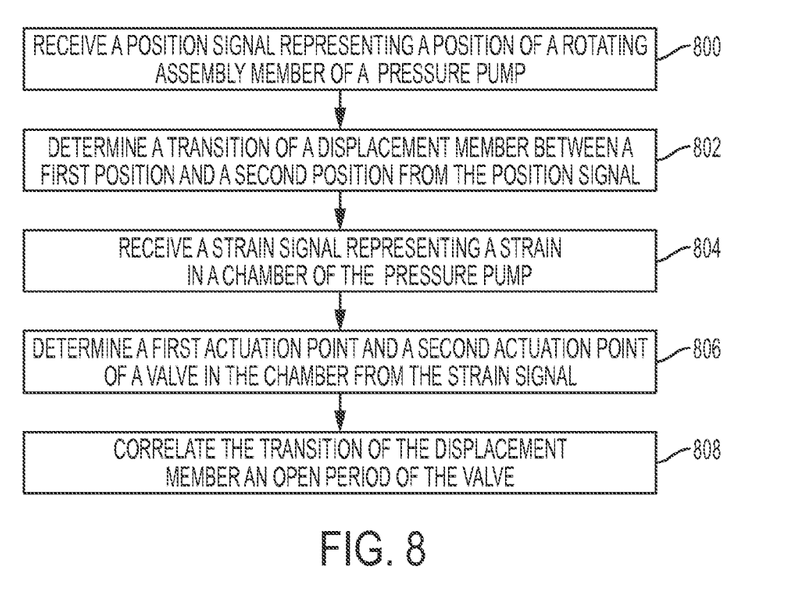
FIG. 8 is a flowchart depicting a process for determining a flow rate for a pressure pump according to one aspect of the present disclosure.

FIG. 8 is a flowchart showing a process for determining a rate of fluid flow through the pressure pump 100. The process is described with respect to the flow-rate monitoring system 200 shown in FIG. 2, although other implementations are possible without departing from the scope of the present disclosure.

In block 800, the computing device 206 may receive a position signal 300, 400 from the position sensor 202. In some aspects, the received signal may be similar to position signal 300 and may be received from the position sensor 202 sensing the position of the crankshaft 108 from a position proximate to the path of the crosshead 112 as described with respect to FIG. 3. In other aspects, the received signal may be similar to position signal 400 and may be received from the position sensor 202 sensing the position of the crankshaft 108 from being positioned on the crankcase of the crankshaft 108 as described with respect to FIG. 4.

In block 802, the computing device 206 may determine a transition of the plunger 114 for the chamber 106 between a first position and a second position based on the position signal 300, 400. The plunger 114 may be mechanically coupled to the crankshaft 108 in a manner such that the movement or position of the plunger 114 is directly related to the movement or position of the crankshaft 108. Based on the mechanical coupling of the crankshaft 108 and the plunger 114, the computing device 206 may determine plunger position reference points 302, 304, 402, 404 corresponding to the position of the plunger 114 at various times during operation of the crankshaft 108 or pressure pump 100. For example, the computing device 206 may reference points 302, 304 representing the top dead center and bottom dead center positions of the plunger 114, respectively.

In block 804, the processor 208 may receive the strain signal 500 from the strain gauge 204. The strain gauge 204 may be positioned on the fluid end 104 of the pressure pump 100 and generate the strain signal 500 corresponding to strain in the chamber 106 of the pressure pump 100. The strain signal 500 may represent a characterization of the strain in the chamber 106 as the suction valve 116 and the discharge valve 118 actuate (e.g., open or close) in response to the operation of the plunger 114 in the chamber 106.

In block 806, the computing device 206 may determine actuation points 502, 504, 506, 508 for the suction valve 116 and the discharge valve 118 corresponding to the opening and closing of the suction valve 116 or the discharge valve 118. In some aspects, the computing device 206 may determine the actuation points 502, 504, 506, 508 based on the discontinuities in the strain signal 500 as described with respect to FIG. 5. The actuation points 502, 504 may represent the opening and closing of the discharge valve 118, respectively. The actuation points 506, 508 may represent the opening and closing of the suction valve 116, respectively. The actuation of the suction valve 116 or discharge valve 118 may be determined based on the trend of strain signal 500 in an upward or downward direction in response to the unloading or loading of strain in the chamber from the actuation of the suction valve 116 and discharge valve. The amount of time between the actuation points (e.g., between the actuation points 502, 504 representing the opening and closing of the discharge valve 118) may correspond to the amount of time that the valve is in an open position to allow fluid to flow.

In block 808, the computing device 206 may correlate the transition of the plunger 114 and the period of time between the opening and closing of the suction valve 116 or discharge valve 118 (e.g., the amount of time that the valve is in the open position). The correlation may allow the flow-rate monitoring system 200 to determine the movement of the plunger 114 during the time that the suction valve 116 or the discharge valve 118 is opened to allow fluid to flow from the inlet manifold 120 into the chamber 106 or from the chamber 106 into the discharge manifold 122. In response to a stroke of the plunger 114, the suction valve 116 may open to allow fluid to flow from the inlet manifold 120 into the chamber 106. As the plunger 114 completes its stroke, the suction valve 116 may close and the discharge valve 118 may open to allow fluid to flow from the chamber 106 into the discharge manifold. The stroke of the plunger 114 may correspond to the volume of fluid entering the chamber 106 from the inlet manifold 120 or the volume of fluid discharged from the chamber 106 into the discharge manifold 122. The rate of fluid flowing into the chamber 106 or into the discharge manifold may correspond to the flow rate of fluid through the pressure pump 100 as described herein.

In some aspects, pump monitoring systems are provided according to one or more of the following examples:

Example #1

A flow-rate monitoring system for use in wellbore treatment operations may comprise a strain gauge positionable on a fluid end of a pump to measure strain in a chamber of the pump and generate a strain signal representing strain in the chamber. The strain signal may be usable in determining a first actuation point corresponding to an opening of a valve in the chamber and a second actuation point corresponding to a closing of the valve. The flow-rate monitoring system may also comprise a position sensor positionable on a power end of the pump to sense a position of a member of a rotating assembly of the pump and generate a position signal representing the position of the member during operation of the pump. The flow-rate monitoring system may also comprise a computing device couplable to the strain gauge and the position sensor. The computing device including a processing device for which instructions executable by the processing device are used to cause the processing device to determine an amount of time between the first actuation point and the second actuation point corresponding to an open period of the valve and determine a volume of fluid entering into or discharging from the chamber during the open period of the valve.

Example #2

The flow-rate monitoring system of Example #1 may feature the strain gauge being positionable on an external surface of the fluid end of the pump to measure the strain in the chamber of the pump.

Example #3

The flow-rate monitoring system of Examples #1-2 may feature the position sensor being positionable proximate to the rotating assembly to determine the position of the member.

Example #4

The flow-rate monitoring system of Examples #1-3 may feature the position sensor being positionable on a crankcase to determine a bolt pattern representing the position of the member.

Example #5

The flow-rate monitoring system of Examples #1-4 may feature a memory device comprising instructions executable by the processing device for causing the processing device to determine the first actuation point and the second actuation point of the valve based on discontinuities in the strain signal and determine the movement of a plunger in the chamber by correlating the position of the member with a ratio representing a mechanical correlation of the position of the plunger and the position of the member.

Example #6

The flow-rate monitoring system of Examples #1-5 may feature the valve being a suction valve positionable in the chamber to open to allow manifold fluid to enter the chamber from an inlet manifold of the pump. An intake rate of the manifold fluid entering the chamber may correspond to a flow rate of the fluid through the pump.

Example #7

The flow-rate monitoring system of Examples #1-6 may feature the valve being a discharge valve positionable in the chamber to open to allow chamber fluid to discharge from the chamber into a discharge manifold. A discharge rate of the chamber fluid discharging from the chamber may correspond to a flow rate of the fluid through the pump.

Example #8

The flow-rate monitoring system of Examples #1-7 may also include a display unit couplable to the computing device. A memory device may comprise instructions executable by the processing device for causing the processing device to generate a representation of an intake rate of manifold fluid into the chamber or a discharge rate of chamber fluid from the chamber, the intake rate and the discharge rate corresponding to a flow rate of the fluid through the pump.

Example #9

The flow-rate monitoring system of Examples #1-8 may feature the pump being coupled to a wellbore. The pump may be operated to inject fluid into the wellbore to stimulate production from formations located adjacent to the wellbore.

Example #10

A pumping system may comprise a pump including a fluid end and a power end. The fluid end of the pump may include a valve actuatable between a first actuation point and a second actuation point in a chamber of the pump through a valve transition between the first actuation point and the second actuation point that is measurable by a strain gauge. The fluid end further may include a plunger in the chamber. The plunger may be mechanically coupled to a crankshaft in the power end of the pump and actuatable between a first reference point and a second reference point through a plunger transition between the first reference point and the second reference point that is measurable by a position sensor. The pumping system may also comprise a computing device couplable to the pump. The computing device may include a processing device for which instructions executable by the processing device are stored for causing the processing device to determine an amount of time between the first actuation point and the second actuation point corresponding to an open period of the valve and determine a volume of fluid entering into or discharging from the chamber during the open period of the valve in response to the plunger transition.

Example #11

The pumping system of Example #10 may feature a memory device comprising instructions executable by the processing device for causing the processing device to determine the first actuation point and the second actuation point of the valve by identifying discontinuities in a strain signal received from the strain gauge and representing strain in the chamber during operation of the plunger.

Example #12

The pumping system of Examples #10-11 may feature the first reference point corresponds to a first plunger position and the second reference point corresponds to a second plunger position. A distance between the first plunger position and the second plunger position may represent a full stroke length of the plunger. A memory device may comprise instructions executable by the processing device for causing the processing device to determine the first reference point and the second reference point of the plunger by correlating a position signal received from the position sensor and representing a position of the crankshaft with a ratio representing a mechanical correlation of the plunger to the crankshaft.

Example #13

The pumping system of Examples #10-12 may feature the strain gauge being couplable to the pump and the computing device. The strain gauge may be positionable on an external surface of the fluid end of the pump to measure a strain in the chamber of the pump and generate a strain signal representing the strain in the chamber. The position sensor may be couplable to the pump and the computing device and may be positionable on an external surface of the power end of the pump to sense a position of the crankshaft and generate a position signal corresponding to the position of the crankshaft.

Example #14

The pumping system of Examples #10-13 may feature the first actuation point of the valve corresponding to an opening of the valve and the second actuation point of the valve corresponding to a closing of the valve. The valve may be a suction valve positioned in the chamber and actuatable in response to the plunger transition to allow manifold fluid to enter the chamber. An intake rate of the manifold fluid entering the chamber may correspond to a flow rate of the fluid through the pump.

Example #15

The pumping system of Examples #10-14 may feature the first actuation point of the valve corresponding to an opening of the valve and the second actuation point of the valve corresponds to a closing of the valve. The valve may be a discharge valve positioned in the chamber and actuatable in response to the plunger transition to allow chamber fluid to discharge from the chamber. A discharge rate of the chamber fluid discharging from the chamber may correspond to a flow rate of the fluid through the pump.

Example #16

The pumping system of Examples #10-15 may also comprise a display unit couplable to the computing device. A memory device may comprise instructions executable by the processing device for causing the processing device to generate a representation of an intake rate of manifold fluid into the chamber or a discharge rate of chamber fluid from the chamber. The intake rate and the discharge rate may correspond to a flow rate of the fluid through the pump.

Example #17

A method for determining a flow rate of fluid through a pump may comprise receiving, from a position sensor coupled to an external surface of a power end of the pump, a position signal representing a position of a member of a rotating assembly of the pump. The method may also comprise determining, by a computing device, a transition of a displacement member between a first position and a second position in a chamber of the pump from the position signal. The method may also comprise receiving, from a stain gauge coupled to an external surface of a fluid end of the pump, a strain signal representing strain in the chamber. The method may also comprise determining, by the computing device, a first actuation point corresponding to an opening of a valve in the chamber and a second actuation point corresponding to a closing of the valve from the strain signal, wherein an amount of time between the first actuation point and the second actuation point corresponding to an open period of the valve. The method may also comprise correlating, by the computing device, the transition of the displacement member with the open period of the valve.

Example #18

The method of Example #17 may feature the displacement member being a plunger. The method may also feature determining the transition of the displacement member including correlating position signal with a ratio representing a mechanical correlation of the plunger to the member of the rotating assembly. The plunger may be mechanically coupled to the member. Determining the first actuation point and the second actuation point includes identifying discontinuities in the strain signal.

Example #19

The method of Examples #17-18 may feature correlating the transition of the displacement member with the open period of the valve including determining a volume of fluid entering the chamber from an inlet manifold during the open period of the valve in response to the transition of the displacement member.

Example #20

The method of Examples #17-19 may feature correlating the transition of the displacement member with the open period of the valve including determining a volume of fluid discharging from the chamber into a discharge manifold during the open period of the valve in response to the transition of the displacement member.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A flow-rate monitoring system for use in wellbore operations, comprising:
a strain gauge positionable on a fluid end of a pump to measure strain in a chamber of the pump and generate a strain signal representing strain in the chamber, the strain signal being usable in determining a first actuation point corresponding to an opening of a valve in the chamber and a second actuation point corresponding to a closing of the valve;
a position sensor positionable on a power end of the pump to sense a position of a member of a rotating assembly of the pump and generate a position signal representing the position of the member during operation of the pump; and
a computing device couplable to the strain gauge and the position sensor, the computing device including a processing device for which instructions executable by the processing device are used to cause the processing device to:
determine an amount of time between the first actuation point and the second actuation point corresponding to an open period of the valve; and
determine a volume of fluid entering into or discharging from the chamber during the open period of the valve.

2. The flow-rate monitoring system of claim 1, wherein the strain gauge is positionable on an external surface of the fluid end of the pump to measure the strain in the chamber of the pump.

3. The flow-rate monitoring system of claim 1, wherein the position sensor is positionable proximate to a path of the rotating assembly to determine the position of the member.

4. The flow-rate monitoring system of claim 1, wherein the position sensor is positionable on a crankcase to determine a bolt pattern representing the position of the member.

5. The flow-rate monitoring system of claim 1, wherein the computing device comprises a memory device including instructions executable by the processing device for causing the processing device to:
determine the first actuation point and the second actuation point of the valve based on discontinuities in the strain signal; and
determine the movement of a plunger in the chamber by correlating the position of the member with a ratio representing a mechanical correlation of the position of the plunger and the position of the member.

6. The flow-rate monitoring system of claim 1, wherein the valve is a suction valve positionable in the chamber to open to allow manifold fluid to enter the chamber from an inlet manifold of the pump, an intake rate of the manifold fluid entering the chamber corresponding to a flow rate of the fluid through the pump.

7. The flow-rate monitoring system of claim 1, wherein the valve is a discharge valve positionable in the chamber to open to allow chamber fluid to discharge from the chamber into a discharge manifold, a discharge rate of the chamber fluid discharging from the chamber corresponding to a flow rate of the fluid through the pump.

8. The flow-rate monitoring system of claim 1, further including a display unit couplable to the computing device, wherein computing device comprises a memory device including instructions executable by the processing device for causing the processing device to generate a representation of an intake rate of manifold fluid into the chamber or a discharge rate of chamber fluid from the chamber, the intake rate and the discharge rate corresponding to a flow rate of the fluid through the pump.

9. The flow-rate monitoring system of claim 1, wherein the pump is coupled to a wellbore, and wherein the pump is operated to inject fluid into the wellbore to stimulate production from formations located adjacent to the wellbore.

10. A pumping system, comprising:
a pump including a fluid end and a power end, the fluid end of the pump including a valve actuatable between a first actuation point and a second actuation point in a chamber of the pump through a valve transition between the first actuation point and the second actuation point that is measurable by a strain gauge, the fluid end further including a plunger in the chamber, the plunger being mechanically coupled to a crankshaft in the power end of the pump and actuatable between a first reference point and a second reference point through a plunger transition between the first reference point and the second reference point that is measurable by a position sensor; and
a computing device couplable to the pump, the computing device including a processing device for which instructions executable by the processing device are used to cause the processing device to:

determine an amount of time between the first actuation point and the second actuation point corresponding to an open period of the valve; and determine a volume of fluid entering into or discharging from the chamber during the open period of the valve in response to the plunger transition.

11. The pumping system of claim 10, wherein the computing device comprises a memory device including instructions executable by the processing device for causing the processing device to determine the first actuation point and the second actuation point of the valve by identifying discontinuities in a strain signal received from the strain gauge and representing strain in the chamber during operation of the plunger.

12. The pumping system of claim 10, wherein the first reference point corresponds to a first plunger position and the second reference point corresponds to a second plunger position, a distance between the first plunger position and the second plunger position representing a full stroke length of the plunger, and wherein computing device comprises a memory device including instructions executable by the processing device for causing the processing device to determine the first reference point and the second reference point of the plunger by correlating a position signal received from the position sensor and representing a position of the crankshaft with a ratio representing a mechanical correlation of the plunger to the crankshaft.

13. The pumping system of claim 10, wherein the strain gauge is couplable to the pump and the computing device, the strain gauge being positionable on an external surface of the fluid end of the pump to measure a strain in the chamber of the pump and generate a strain signal representing the strain in the chamber, and wherein the position sensor is couplable to the pump and the computing device, the position sensor being positionable on an external surface of the power end of the pump to sense a position of the crankshaft and generate a position signal corresponding to the position of the crankshaft.

14. The pumping system of claim 10, wherein the first actuation point of the valve corresponds to an opening of the valve and the second actuation point of the valve corresponds to a closing of the valve, and wherein the valve is a suction valve positioned in the chamber and actuatable in response to the plunger transition to allow manifold fluid to enter the chamber, an intake rate of the manifold fluid entering the chamber corresponding to a flow rate of the fluid through the pump.

15. The pumping system of claim 10, wherein the first actuation point of the valve corresponds to an opening of the valve and the second actuation point of the valve corresponds to a closing of the valve, and wherein the valve is a discharge valve positioned in the chamber and actuatable in response to the plunger transition to allow chamber fluid to discharge from the chamber, a discharge rate of the chamber fluid discharging from the chamber corresponding to a flow rate of the fluid through the pump.

16. The pumping system of claim 10, further comprising a display unit couplable to the computing device, wherein the computing device comprises a memory device including instructions executable by the processing device for causing the processing device to generate a representation of an intake rate of manifold fluid into the chamber or a discharge rate of chamber fluid from the chamber, the intake rate and the discharge rate corresponding to a flow rate of the fluid through the pump.

17. A method for determining a flow rate of fluid through a pump, comprising:

receiving, from a position sensor coupled to an external surface of a power end of the pump, a position signal representing a position of a member of a rotating assembly of the pump;

determining, by a computing device, a transition of a displacement member between a first position and a second position in a chamber of the pump from the position signal;

receiving, from a stain gauge coupled to an external surface of a fluid end of the pump, a strain signal representing strain in the chamber;

determining, by the computing device, a first actuation point corresponding to an opening of a valve in the chamber and a second actuation point corresponding to a closing of the valve from the strain signal, wherein an amount of time between the first actuation point and the second actuation point corresponding to an open period of the valve; and correlating, by the computing device, the transition of the displacement member with the open period of the valve.

18. The method of claim 17, wherein the displacement member is a plunger, wherein determining the transition of the displacement member includes correlating position signal with a ratio representing a mechanical correlation of the plunger to the member of the rotating assembly, wherein the plunger is mechanically coupled to the member, and wherein determining the first actuation point and the second actuation point includes identifying discontinuities in the strain signal.

19. The method of claim 17, wherein correlating the transition of the displacement member with the open period of the valve includes determining a volume of fluid entering the chamber from an inlet manifold during the open period of the valve in response to the transition of the displacement member.

20. The method of claim 17, wherein correlating the transition of the displacement member with the open period of the valve includes determining a volume of fluid discharging from the chamber into a discharge manifold during the open period of the valve in response to the transition of the displacement member.

* * * * *